United States Patent [19]

Gesser et al.

[11] Patent Number: 4,740,282

[45] Date of Patent: Apr. 26, 1988

[54] HYDROPHILIZATION OF HYDROPHOBIC INTRAOCULAR LENSES

[76] Inventors: Hyman D. Gesser, 218 Girton Boulevard, Winnepeg, Manitoba, Canada, R3P 0A7; Robert E. Warriner, 106 Lonsdale Road, Winnipeg, Manitoba, Canada, R2Y 0N2

[21] Appl. No.: 948,048

[22] Filed: Dec. 31, 1986

Related U.S. Application Data

[63] Continuation-in-part of Ser. No. 771,240, Aug. 30, 1985, abandoned.

[51] Int. Cl.$^4$ .................. B05D 3/06; B05D 5/06; C07C 3/24
[52] U.S. Cl. .................. 204/165; 204/169; 427/35; 427/40; 427/45.1; 427/164
[58] Field of Search .................. 204/165, 168, 169; 427/45.1, 164, 166, 255.6, 35, 40

[56] References Cited

U.S. PATENT DOCUMENTS

| | | | |
|---|---|---|---|
| 3,183,152 | 5/1965 | Szekely et al. | 167/59 |
| 3,925,178 | 12/1975 | Gesser et al. | 204/165 |
| 3,940,207 | 2/1976 | Barkdoll | 351/160 |
| 3,944,347 | 3/1976 | Barkdoll | 351/160 |
| 4,170,043 | 10/1979 | Knight et al. | 128/321 X |
| 4,170,661 | 10/1979 | Knight et al. | 427/2 |
| 4,409,258 | 10/1983 | Feurer et al. | 427/38 |
| 4,445,991 | 5/1984 | Arbit | 204/168 |
| 4,569,858 | 2/1986 | Lim et al. | 427/164 |

FOREIGN PATENT DOCUMENTS 846143 7/1970 Canada.

OTHER PUBLICATIONS

Schlick, S. et al., *On the Apparent Reactions of Excited Inert-Gas Atoms with Organic Solids*, The Journal of Chemical Physics, vol. 47, No. 5, 1875-1876, Sep. 1, 1967.

Hansen et al., Polymers Letters, vol. 4, pp. 203-209 (1966).

Hudis et al., J. Appl. Polym. Sci., vol. 19, pp. 451-459 (1975).

Sharma et al., J. Appl. Polym. Sci., vol. 26, pp. 2205-2210 (1981).

*Primary Examiner*—Michael R. Lusignan
*Attorney, Agent, or Firm*—McFadden, Fincham & Co.

[57] ABSTRACT

This invention relates to a process for the treatment of synthetic plastic, hydrophobic, transparent, intraocular lenses to avoid trauma which causes protein adhesion to occur on the surface of the lens thereby causing endothelial cell damage and corneal deterioration. The process includes the first step of cross-linking the surface of the synthetic plastic, hydrophobic, transparent, intraocular lens by treating the lens with a stream of gas containing from about 5-100% by weight hydrogen of a low pressure of about 0.5-5 Torr in the presence of an A.C. electrical discharge. The second step involves treating such cross-linked surface with hydroxyl radicals, thereby to hydrophilize the surface. The hydrogen may be pure or a component of an inert gas mixture, e.g. in helium. The hydroxyl radicals may be generated in a variety of ways, from low pressure water vapor by electric corona discharge, direct current discharge, alternating current discharge, microwave discharge, and radiofrequency discharge; from aqueous hydrogen peroxide by photolysis and radiolysis, or modified Fenton's reagent using $Ti_{3+}$, $V^{4+}$, $Cr^{2+}$, or $Fe^{2+}$ ions, or by electrolysis of oxygen to form aqueous hydrogen peroxide in the presence of the same ions. The product is a synthetic plastic, hydrophobic, transparent, intraocular lens having a permanently hydrophilized surface, which does not cause trauma in the eye when utilized as an intraocular lens following surgery. Previous intraocular lenses do not retain hydrophilicity, the surface reverting to hydrophobicity with time.

6 Claims, No Drawings

HYDROPHILIZATION OF HYDROPHOBIC INTRAOCULAR LENSES

This application is a continuation-in-part of application 06/771,240, filed Aug. 30, 1985, abandoned.

BACKGROUND

This invention relates to hydrophilizing a hydrophobic intraocular lens (IOL). Contact lenses are known and are worn exterior to the eye and are usually removed for a period daily. Intraocular lenses are made of materials similar to those used for contact lenses, for example polymethylmethacrylate (PMMA), silicone rubber or other suitable transparent polymeric material. Contact lenses are often hydrophilized by various methods to reduce irritation, and equally are softened by various methods for the same reason to reduce irritation. Although hydrophobic materials and hard materials cause irritation, the irritations are not equivalent, and the methods of softening and hydrophilizing are not equivalent.

Intraocular lenses are inserted into the eye to replace the natural lens, which typically has become opaque, for example due to cataract development in a patient. The natural lens is surgically removed, through an incision at the edge of the cornea, then the intraocular lens is inserted into the anterior or posterior chamber of the eye. Irreversible damage may be caused to the endothelium cells of the cornea, if they are touched by a hydrophobic surface, such as the lens or surgical instruments. As the intraocular lens becomes a permanent fixture in the eye, it is strongly desirable to dehydrophobize or hydrophilize the surface of the lens to circumvent this destruction. One approach is to coat the lens with a material which renders the surface hydrophilic, such as polyvinylpyrrolidone, methylcellulose, polyvinylalcohol and even guar gums, using a coating solution. Similar treatments have been used for contact lenses, see for example U.S. Pat. No. 3,183,152, issued May 11, 1965 to Szekely et al., teaching a treated polyvinylalcohol for contact lenses. Similar coatings are taught for intra-ocular lenses, in the following articles:

by H. E. Kaufman et al.,
Endothelial Damage from Intraocular Lens Insertion. Inv. Opth. Vol 15 pp 996–1000 (1976).
Prevention of Endothelial Damage from Intraocular Lens Insertion. Tr. Am. Acad. Opth. & Otol. Vol 83 pp 204–212 (1977).
Pathology of the Corneal Endothelium. Inv. Opth. Visual Sci. Vol 16 pp 265–268 (1977).
Corneal Endothelium Damage with Intraocular Lenses: Contact Adhesion Between Surgical Materials and Tissue. Science Vol 198 pp 525–527 (1977).
by P. U. Fechner,
Methylcellulose in Lens Implantation. J. Am. Intraocular Implant Soc. Vol 3 pp 180–181 (1977).
by P. M. Knight et al. in U.S. Pat. Nos. 4,170,043 and 4,170,661, both issued Oct. 9, 1979.

All these teach or suggest coating the intraocular lens with a suitable hydrophilic material. While some of these coatings may be effective in reducing damage to the corneal endothelium cells during surgery (especially if used within 30 minutes after treatment) they quickly disperse and leave the surface once the IOL is in the eye thus returning the lens to its original hydrophobic state.

The trauma of surgery generates protein in the vitreous fluid (of the eye) which can deposit on hydrophobic surfaces and thus coat the IOL rendering it less transparent. As it is known that coatings cannot prevent such protein adsorption, other solutions have been adopted, which include making the lens entirely of hydrophilic plastic such as hydroxyethylmethacrylate or grafting a hydrophilic polymer to a PMMA lens. The former solution results in an unstable lens which tends to distort with time whereas the latter solution, though potentially effective, adds considerably to the cost of the lens. There is consequently a need for a method of permanently hydrophilizing the surfaces of intraocular lenses.

DESCRIPTION OF THE PRIOR ART

Hydrophilization of hydrophobic surfaces is known. The present inventors have described methods of hydrophilizing hydrophobic surfaces applied to contact lenses, in U.S. Pat. No. 3,925,178 issued Dec. 9, 1975, using hydroxyl free radicals, and Canadian Pat. No. 846,143 issued Jul. 7, 1970 where additional methods are described to hydrophilize contact lenses. One problem has been encountered with the durability of the hydrophilic surface. It has been found that a surface of silicone rubber which is hydrophobic and has a contact angle of 80° for water will, when treated for 10 min. in an electrical AC discharge of flowing water vapor at 1 torr in vacuum, become hydrophilic and exhibit a contact angle of 15°. However when kept at 37° C. for 3 hours, the contact angle increased to 40° and overnight to the original 80°. The surface hydrophilicity is transient, it is believed that this is due to elastomers such as silicone rubber exchanging molecular segments with bulk molecules because of the mobility of the polymer chains, thus changing the surface. Sharma et al., J. App. Polym. Sci. Vol 26 pp 2205–2210 (1981), noted that gas plasma surface modified conventional polymers do not generally retain the hydrophilization, contact angle or wettability characteristics induced by the surface modification over a long period of time. A polypropylene surface when made hydrophilic, decayed slowly over a period of five months the contact angle increasing from 22° to 60°. These characteristics tend to return to the original with time, the delay being longer with more intense and longer treatment. The gas plasma treatment used various gases.

It is known to treat the surface of polymers for the purpose of improving adhesion by modifying surface phenomena, the technique misleadingly called CASING (Crosslinking by Activated Species of INert Gases), was applied to improve the adhesive properties of polymers, without affecting wettability, this was believed to form a crosslinked shell at the polymer surface (Hansen et al., Polymer Letters Vol 4 pp 203–209 (1966)). The only use even remotely discussed in the paper was improvement of adhesion, and there is no suggestion that the treatment could lead to other applications. The polymer surface was treated and then it was adhered to another treated polymer (not necessarily identical) surface using a conventional adhesive. It was discovered later that the description was wrong and that the active agent was suggested to be radicals formed by nitrogen or hydrogen present as a contaminant in the inert gas (Schlick et al., J. Chem. Phys. Vol 47 pp 1874–1876 (1967)), in this paper no utility whatsoever was suggested.

This there is a need for stable hydrophilized intraocular lenses and a method of preparing these.

GENERAL DESCRIPTION OF THE INVENTION

The invention provides a process for the treatment of synthetic plastic, hydrophobic, transparent, intraocular lenses to avoid trauma which causes protein adhesion to occur on the surface of the lens thereby causing endothelial cell damage and corneal deterioration, which process comprises the steps, in sequence of: (a) crosslinking the surface of the synthetic plastic, hydrophobic, transparent, intraocular lens by treating the lens with a stream of gas containing from about 5-100% by weight hydrogen at a low pressure of about 0.5-5 Torr in the presence of an A.C. electrical discharge; and (b) treating such cross-linked surface with hydroxyl radicals, thereby to hydrophilize the surface. The intraocular lens when it loses its hydrophilicity cannotbe removed easily from the eye for rehydrophilizing, whereas the contact lens can easily be removed for rehydrophilizing should this be necessary. The permanent hydrophilization while equally useful in both IOL and contact lens is more critical in an IOL.

The first step is preferably carried out at an electrical discharge of about 1000 volts at a pressure of about 1 Torr, most preferably, for at least about ½ hour.

The second step may be carried out in a variety of ways, for example by forming the hydroxyl radicals by electrical discharge through water vapor at low pressure, by microwave discharge through water vapor at low pressure, by radiofrequency discharge through water vapor at low pressure; alternatively by generating the radicals in solution, by photolysis of aqueous hydrogen peroxide, by radiolysis of aqueous hydrogen peroxide, or reaction of aqueous hydrogen peroxide with ferrous ions in acidic aqueous solution, or a modified Fenton's reagent wherein the ferrour ions are replaced with aqueous $Cr^{2+}$, $Ti^{3+}$, or $V^{4+}$ ions, in theory aqueous $Cu^+$ ions can also be used. The aqueous hydrogen peroxide can be generated by electrolysis of oxygen in water in the solution. "Low pressure" is herein defined as from 0.05 to 5 torr.

This invention also provides a process whereby the hydroxyl radicals are produced by a process selected from the group consisting of: (a) corona electric discharge, direct current electric discharge, alternating current electric discharge, microwave electromagnetic discharge and radiofrequency electromagnetic discharge from water vapor at low pressure; (b) radiolysis of aqueous hydrogen peroxide; (c) photolysis of aqueous hydrogen peroxide; (d) the use of a modified Fenton's reagent wherein the hydrogen peroxide has a concentration of about 0.05 M to 5 M, the acid has a concentration of about 0.01 M to 3 M, and the metal ion is selected from the group of $Ti^{3+}$, $V^{4+}$, $Cr^{2+}$, and $Fe^{2+}$ and has a concentration of about 0.05 M to 2 M; (e) the use of a modified Fenton's reagent wherein the hydrogen peroxide has a concentration of about 0.05 M to 5 M, the acid has a concentration of about 0.01 M to 3 M, and the metal ion is $Ti^{3+}$ in a concentration of about 0.05 M to 2 M; and (f) the use of an electrochemical cell, wherein hydrogen peroxide is generated by electrolysis of oxygen in water, the cathode having a potential of $-0.2$ to $-0.6$ V with respect to a standard calomel electrode, and the hydrogen peroxide reacting with a metal ion selected from the group of $Ti^{3+}$, $V^{4+}$, $Cr^{2+}$, and $Fe^{2+}$ in a concentration of about 0.01 M to 0.4 M, in the presence of acid in the concentration of about 0.001 to 3 M.

Although it was known that a shell was formed by "CASING", until this shell was hydrophilized and tested for durability, it was not predictable that this shell would maintain the acquired hydrophilicity. The process is taught by Hansen to increase the molecular weights of low molecular weight polymeric fractions (which would not necessarily make the new surface permanent), it is not taught that this effectively "freezes" the surface.

DETAILED DESCRIPTION OF THE INVENTION

The invention is described with reference to preferred embodiments. The surface to which the process is applied is typically a transparent elastomeric hydrophobic plastic, examples are silicone rubber, or a copolymer of silicone rubber and other polymeric hydrocarbon substances, a fluorocarbon polymer, a fluorosilicone polymer, or polymethylmethacrylate. Hydroxyl radicals can be prepared in many ways but in some cases the method is inconvenient, expensive or inappropriate in terms of either toxicity or damage to the eye, lens, or environment. Thus an electrical discharge at about 1000 Volts AC through water vapor at low pressure of about 1 torr is one of the simplest and most desirable methods of generating hydroxyl free radicals. By placing an IOL into the discharge region or downstream from the discharge the contact angle of the IOL (made from PMMA plastic) can be changed from an initial value of 75° to 15°, thus effectively rendering the surface hydrophilic. It is therefore possible to react the surface with hydroxyl free radicals (OH) and to partially replace the surface functional groups, namely the carbon-hydrogen (C—H) bonds by carbon-hydroxyl (C—OH) bonds thus rendering the surface hydrophilic.

The types of discharges which can split water into the hydrogen atom and a hydroxyl radical include a direct current discharge, corona discharge, alternating current discharge, high frequency discharge and microwave discharge. The hydroxyl radicals can also be generated by radiolysis (using $\beta$ and $\gamma$ rays) and by photolysis (at about 254 nm) of water and hydrogen peroxide. The degree of wetting achieved is only limited by the rate of generation of the hydroxyl radicals and the duration of the exposure of the plastic surfaces to these hydroxyl free radicals.

The depth of the hydrophilic zone is believed to be about one atomic layer and thus is not capable of withstanding any abrasive action. However the IOL in the eye is free of such surface contact and the hydrophilization treatment should last indefinitely.

We have found that this surface exchange can be greatly reduced or entirely eliminated by a method misnamed Crosslinking the surface by Activated Species of Inert Gases ("CASING") by Hansen & Schonhorn (Polymer Letters Vol 4, pp 203–9, 1966). However it was suggested that the radicals could be formed from nitrogen or hydrogen atoms present in the inert gas (helium), (see S. Schlick et al., J. Chemical Physics, Vol 47, pp 1874–6, 1967). When a sample of silicone rubber is first subjected to crosslinking by being placed in an electrical discharge of flowing 5% $H_2$ at about 1 torr in vacuum in He for ½ hour the contact angle did not change from an initial value of 80°. However if the sample was then treated for 15 min. in an electrical discharge of flowing water vapor at a pressure of 1 torr in vacuum the contact angle of the silicone rubber remains at about 18° even when kept at a temperature of 37° C. overnight. Longer exposure was complicated by atmospheric contamination of the laboratory. However when a similar sample was stored for 1 month in saline water at 37° C. it retained most of its wetting properties.

The hydrogen concentration can range from traces to high percentages in helium to pure hydrogen. The time required for cross-linking a surface is determined by the concentration of H atoms produced, which is dependent on the discharge current, pressure and hydrogen gas concentration in the vacuum. We found it convenient to use a 5% $H_2$ in He mixture though pure hydrogen would also be effective.

Rigid plastics such as polymethylmethacrylate may not require CASING prior to hydrophilization, if wetting is required for short periods only, though it cannot do any harm especially if an electrical discharge is to be used for the hydrophilization process since under these conditions the same discharge apparatus can be used for CASING and wetting (hydrophilizing) and the lens need not be removed from the apparatus—only the gases have to be changed from $H_2$/He for CASING to $H_2O$ for wetting. However in the case of IOL, permanency of wetting is required, while surface exchange in PMMA is very slow-it has not been shown to be nonexistent. Hence for PMMA IOL it is essential that surface crosslinking be done before the lens is made hydrophilic.

It is also possible to effect wetting of a plastic surface such as PMMA by the generation of hydroxyl free radicals (OH) in solution. The most common method is the use of the well known Fenton's reagent (see C. Walling, Fenton's Reagent Revisited, Accounts of Chemical Research, Vol. 8, pp 125-31, 1975) which consists of the reaction of $Fe^{2+}$ with $H_2O_2$ in the presence of acid:

$$Fe^{2+} + H_2O_2 + H^+ \rightarrow Fe^{3+} + H_2O + OH \quad (1)$$

several metallic ions such as $Cr^{2+}$, $Ti^{3+}$, or $V^{4+}$ can be substituted for $Fe^{2+}$ in a modified Fenton's Reagent (see Samuni et al. The Kinetics of Oxidation of Chromium (II), Titanium (III) and Vanadium (IV) by Hydrogen Peroxide and Hydroxyl Radicals. J. Chemical Society, Dalton Trans. pp 1273-7, 1972). We prefer the use of $Ti^{3+}$ which has been found to be very effective in reducing the contact angle of a thin slide of PMMA from 75° to 20° when stirred in a solution (for more than 15 min) which was 2.5 M $H_2O_2$, 0.2 M $Ti^{3+}$ and 0.5 M $H_2SO_4$. This solution, however, must be freshly prepared in order to be effective. Under these conditions it was found that the range of the concentration of $H_2O_2$ could vary from about 0.05 M to 5 M and the acid ($H_2SO_4$) varied from about 0.01 M to 3 M. The metal ions used besides $Ti^{3+}$ were $Cr^{2+}$ and $V^{4+}$ in the concentration range of about 0.05 to 2 M. In all cases the time required to achieve the lowest contact angle of a plastic surface was determined by the above concentrations and was about 30 min. for high concentrations of the $H_2O_2$ and metal ion.

It is also possible to prepare the hydrogen peroxide in solution by the electrolysis of oxygen, which may be present as air by the reaction $$O_2 + 2e^- + 2H^+ \rightarrow H_2O_2 \quad (2)$$

In the presence of $Fe^{2+}$ the hydroxyl radicals can be generated by the Fenton's reaction (2). Under these conditions, any $Fe^{3+}$ formed can be further reduced by the reaction $$Fe^{3+} + e^- \rightarrow Fe^{2+} \quad (3)$$

(See R. Tomat & A. Rigo, Electrochemical Production of OH radicals and Their Reaction with Toluene. J. Appl. Electrochem. Vol 6, pp 257-61, 1976 and B. Fleszar & A. Sobkowiak, Hydroxylation of Benzene and Phenol During Electroreduction of Oxygen. Electrochem. Acta Vol 28, pp 1315-18, 1983). Hence the hydroxylation reaction can be run for an extended time as long as oxygen and an electric current are supplied to the solution. In one experiment a split cell was used in which the anode and cathode compartments were separated by a porous sintered glass disc. The cell was filled with 0.1 M $H_2SO_4$ and to the cathode compartment was added $FeSO_4$ so as to make the solution 0.1 M in $Fe^{2+}$. A lead foil cathode and a platinum wire anode were connected to a controlled DC source. The cathode potential was controlled to $-0.5$ V with respect to a saturated calomel electrode (SCE) and a current of 130 mA was measured. Oxygen was bubbled into the stirred solution of the cathode compartment and a thin PMMA slide was added. After 4 hours the sample of PMMA was removed and shown to have a contact angle of 22° compared to 75° before hydroxylation.

Similar experiments were performed using silicone rubber slides and again the contact angle changed from an initial value of 83° to 20°. However this change was only longlasting when the silicone rubber surface was first cross-linked before being made hydrophilic.

The potential used is dependent on the strength of the acid and could be varied from $-0.2$ V to $-0.6$ V relative to the SCE when the acid was varied 0.3 M to 0.001 M respectively.

Similar experiments were conducted using $Cr^{2+}$, $Ti^{3+}$ and $V^{4+}$ instead of $Fe^{2+}$ in the electrochemical cell. The acid concentration varied from 0.001 M to 3 M and the metal ion concentration varied from 0.01 M to 0.4 M. It was found that the time required to obtain the lowest contact angle for a PMMA slide or silicone rubber slide depended on the concentration used and the current used to generate the OH free radicals. In general the higher the concentration of the metal ion and the $H_2O_2$ the shorter was the time required, but in order to ensure optimum wetting we invariably found that three or four hours were required for minimum contact angles of the slides used. The smaller surface of a lens would require a lesser time for wetting.

Thus IOL treated by these hydrophilization methods will retain water on the surface of the lens and this water tends to insulate the lens from the corneal endothelium cells during surgery. After implantation in the eye the hydrophilic IOL will remain hydrophilic and thus resist the deposition of protein onto its surface.

The detailed description of specific preferred embodiments and examples has been used to illustrate the invention. However it is understood by those skilled in the art that numerous variations and modifications can be made to these examples without departing from the spirit and scope of the invention.

We claim:

1. A process for the treatment of synthetic plastic, hydrophobic, transparent, intraocular lenses to avoid trauma which causes protein adhesion to occur on the surface of the lens thereby causing endothelial cell damage and corneal deterioration, which process comprises the steps, in sequence of:
  (a) cross-linking the surface of said synthetic plastic, hydrophobic, transparent, intraocular lens by treating said lens with a stream of gas containing from about 5–100% by weight hydrogen at a low pressure of about 0.5–5 Torr in the presence of an A.C. electrical discharge; and
  (b) treating such cross-linked surface with hydroxyl radicals, thereby to hydrophilize said surface.

2. The process of claim 1 wherein said stream of gas comprises a stream of helium gas containing at least about 5% by weight hydrogen therein.

3. The process of claim 1, wherein said hydroxyl radicals are generated by a process selected from the group consisting of:
  (a) corona electric discharge, direct current electric discharge, alternating electric current discharge, microwave electromagnetic discharge and radiofrequency electromagnetic discharge from water vapor at low pressure;
  (b) radiolysis of aqueous hydrogen peroxide;
  (c) photolysis of aqueous hydrogen peroxide;
  (d) the use of a modified Fenton's reagent wherein the hydrogen peroxide has a concentration of about 0.05 M to 5 M, the acid has a concentration of about 0.01 M to 3 M, and the metal ion is selected from the group consisting of $Ti^{3+}$, $V^{4+}$, $Cr^{2+}$, and $Fe^{2+}$ and has a concentration of about 0.05 M to 2 M;
  (e) the use of a modified Fenton's reagent wherein the hydrogen peroxide has a concentration of about 0.05 M to 5 M, the acid has a concentration of about 0.01 M to 3 M, and the metal ion is $Ti^{3+}$ in a concentration of about 0.05 M to 2 M; and
  (f) the use of an electrochemical cell, wherein hydrogen peroxide is generated by electrolysis of oxygen in water, the cathode having a potential of $-0.2$ to $-0.6$ V with respect to a standard calomel electrode, and said hydrogen peroxide reacting with a metal ion selected from the group consisting of $Ti^{3+}$, $V^{4+}$, $Cr^{2+}$, and $Fe^{2+}$ in a concentration of about 0.01 M to 0.4 M, in the presence of acid in the concentration of about 0.001 to 3 M.

4. The process of claim 1 wherein said synthetic plastic hydrophobic, transparent, intraocular lens is formed from a plastic selected from the group consisting of silicone rubber, copolymers of silicone rubber and other polymeric substances, fluorocarbon polymers, fluorosilicone polymers and polymethylmethacrylate.

5. A process for the treatment of synthetic plastic, hydrophobic, transparent, intraocular lenses to avoid trauma which causes protein adhesion to occur on the surface of the lens thereby causing endothelial cell damage and corneal deterioration, which comprises the steps, in sequence of
  (a) cross-linking the surface of said synthetic plastic, hydrophobic, transparent, intraocular lens by treating said lens with a stream of helium gas containing from about 5–100% by weight hydrogen of a low pressure of about 0.5–5 Torr in the presence of an A.C. electrical discharge of about 1000 V for ½ hour; and
  (b) treating such cross-linked surface with hydroxyl radicals by the use of an A.C. electrical discharge through flowing water vapour at a pressure of about 1 Torr for about 15 minutes.

6. The process of claim 5 wherein said synthetic plastic hydrophobic, transparent, intraocular lens is formed from a plastic selected from the group consisting of silicone rubber, copolymers or silicone rubber and other polymeric substances, fluorocarbon polymers, fluorosilicone polymers and polymethylmethacrylate.

* * * * *